July 7, 1931.  H. L. MITCHELL ET AL  1,813,068
POWER CLUTCH
Filed Feb. 4, 1929  2 Sheets-Sheet 1

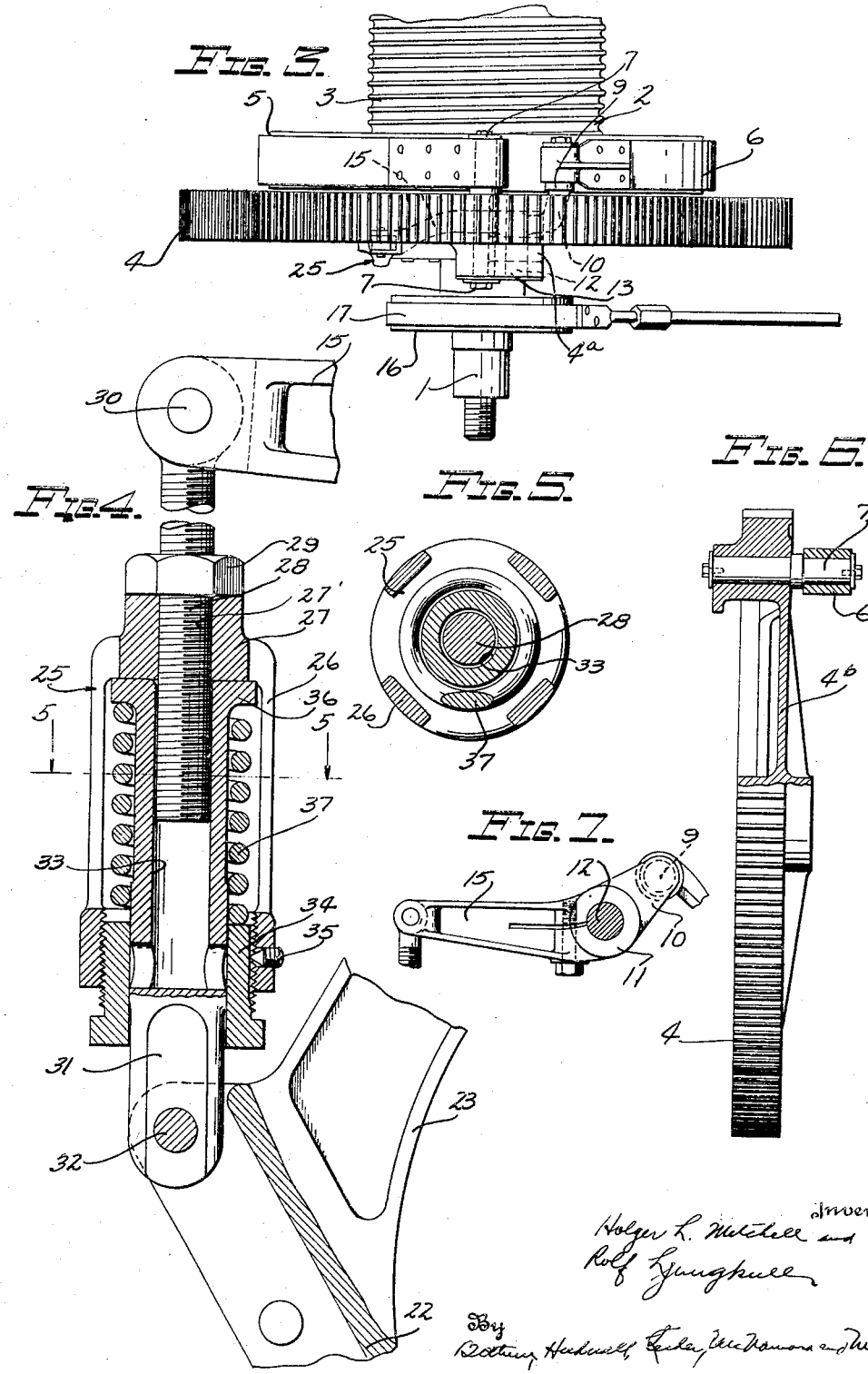

Patented July 7, 1931

1,813,068

UNITED STATES PATENT OFFICE

HOLGER L. MITCHELL AND ROLF LJUNGKULL, OF MILWAUKEE, WISCONSIN, ASSIGNORS TO HARNISCHFEGER CORPORATION, OF MILWAUKEE, WISCONSIN, A CORPORATION OF WISCONSIN

POWER CLUTCH

Application filed February 4, 1929. Serial No. 337,185.

This invention relates to a power clutch especially designed and adapted for use on excavating machinery or the like although also well adapted for other uses and applications.

In excavating machinery of the type in which the present invention finds advantageous use, a digging drum and hoisting drums or other similar elements are utilized to control and operate the various instrumentalities of the machine and these drums are driven from an internal combustion engine or other form of power plant through power actuated friction clutches each of which includes a clutch band carried by a constantly rotated driving element and contracted, at will, about a flange of the drum to be actuated. One example of such an excavating machine is shown in Patent No. 1,570,108 granted January 19, 1926, to Lewis Wehner, although in the Wehner patent the friction clutches are directly operated from hand levers. In the commercial embodiment of the Wehner patent, an auxiliary control drum is incorporated in the operating mechanism provided between the hand control lever and the main clutch band. When the digging drum or other drum controlled is idle or stationary, the driving element, the main clutch band carried thereby, the auxiliary drum and the linkage employed between the auxiliary drum and the main clutch band, all rotate as a unit. When the hand control lever is appropriately manipulated, a brake band is contracted about the auxiliary drum to momentarily stop the same and to thereafter retard its motion and when so stopped and retarded the auxiliary drum acts through the linkage to contract the main clutch band on the flange of the drum with which it is associated thereby causing such drum to rotate with the driving element. In all prior constructions the linkage or operating mechanism employed between the auxiliary drum and the main clutch band has been positive and unyielding and as a result the main clutch band frequently takes hold with a jar or jerk thereby subjecting various parts of the excavating machinery to shocks and excessive strains and promoting rapid wear of the brake bands as well as causing, at times, breakage of certain of the parts.

One of the principal objects of the present invention is to avoid this jarring and jerking action and to cause the main band to gradually tighten and take hold of its drum thereby producing a smooth and easy operation that relieves all the parts of the machine of shocks and excessive strains and preserves the bands. Impact loads and the overloading of the band that sometimes occurred with prior devices are avoided and band breakage is prevented and unnecessary wear and tear on the entire machine is eliminated.

In carrying out the present invention the advantageous features of the well known power clutch are retained and in the linkage or operating mechanism between the auxiliary drum and the main clutch band, yieldable or elastic means is so incorporated as to be effective to transmit the positive actuating force of the auxiliary drum to the main clutch band in such manner as to cause this main clutch band to take hold of the flange of its drum gradually and with a yielding pressure which avoids overloading as well as shocks and excessive strains. And embodied in the yieldable means is an adjustment for the main clutch band which is easily manipulated to obtain just the proper clearance between the main clutch band and its drum flange when assembling the machine as well as later for taking up wear.

Another object of the invention is to provide a power clutch having these advantages and capacity and which is simple and durable in construction, reliable and effective in operation and easy and comparatively inexpensive to manufacture and apply.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a fragmentary plan view of a power clutch and of a portion of the drum which it is utilized to drive;

Figure 4 is a fragmentary detail view partly in side elevation and partly in central vertical section illustrating the adjustable yieldable connection incorporated in the linkage between the auxiliary drum and the main clutch band;

Figure 5 is a detail view in section taken on line 5—5 of Figure 4;

Figure 6 is a detail view partly in end elevation and partly in section in the plane of line 6—6 of Figure 1 and illustrating the driving gear and the means employed for anchoring one end of the main clutch band thereto; and Figure 7 is a detail view showing the mounting of the crank and its operating arm on the driving element.

Figure 1:
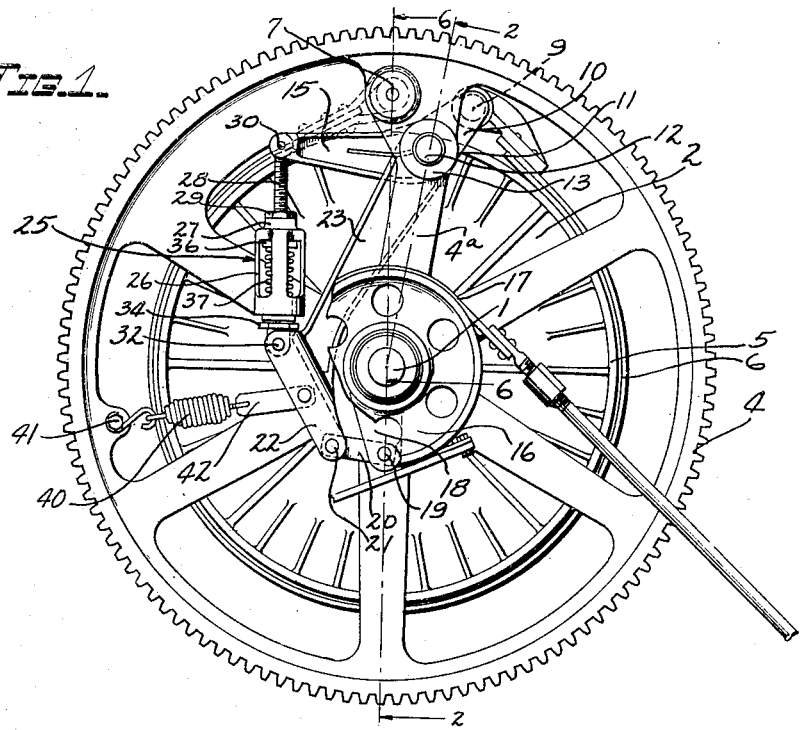
Figure 1 is a view in side elevation showing a power clutch embodying the present invention.
Figure 2:
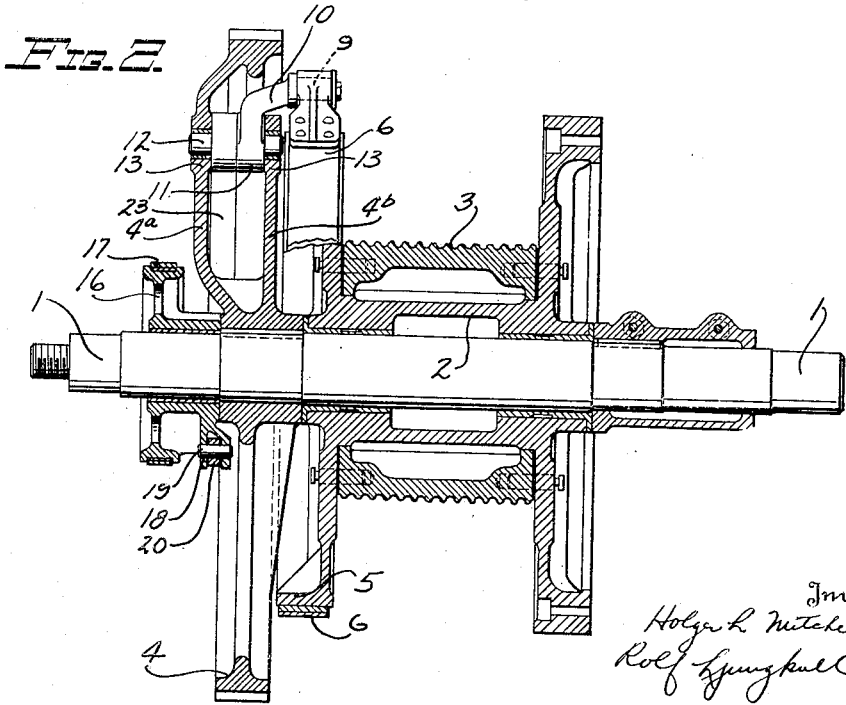
Figure 2 is a view in section taken in the plane of line 2—2 of Figure 1, parts being shown in elevation for the sake of illustration.

Referring to the drawings numeral 1 designates a drive shaft commonly referred to as a digging shaft. On the shaft 1 a drum 2 is loosely mounted and may be provided with lagging 3 or otherwise adapted to actuate the elements of the excavating machine with which it is associated. A driving gear 4 is keyed or otherwise suitably fixed to the shaft 1 and this driving gear is constantly driven from the power plant in accordance with the usual practice. One end of the drum 2 is formed with an annular flange 5 constituting a clutch drum and with this flange 5 a main clutch band 6 coacts. One end of the clutch band 6 is dead ended as at 7 on the driving gear 4 and the other end is pivotally connected to a crank pin 9 provided on a crank arm 10. The crank arm 10 has a hub 11 clamped or otherwise suitably fixed to a mounting pin 12 rotatably supported in bearings 13 provided therefor on spaced webs 4a and 4b of the driving gear 4. The crank arm 10 also has an integral operating arm 15 which is actuated in a novel manner from an auxiliary control drum 16.

The auxiliary control drum 16 is loosely mounted on the drive shaft 1 adjacent the driving gear 4 and normally it rotates with the driving gear. The usual brake band 17 coacts with the drum 16, this brake band 17 having one end anchored or dead ended on the frame and having its other end connected through suitable motion transmission means to the usual hand control lever (not shown).

The hub of the control drum 16 is provided with a bifurcated lug 18 which may be integral with the hub and which extends radially therefrom. The outer end of this lug 18 is pivoted as at 19 to one end of a link 20 and the opposite end of the link 20 is pivoted as at 21 to the enlarged end 22 of a lever 23. The end of the lever 23 opposite to that connected to the link 21 is pivotally mounted on the mounting pin 12. An adjustable and yieldable connection designated generally at 25 is interposed between and connects the enlarged end of the lever 23 and the outer end of the operating arm 15.

As shown in detail in Figures 4 and 5, this connecting and yielding means 25 includes a cage or casing 26 having a head portion 27 formed with a threaded opening 27' with which the threaded shank of an eyebolt 28 is engaged. By turning the eyebolt it may be adjusted relative to its cage 26 and it may be locked in any adjustment by means of a lock nut 29. The eye of the bolt 28 is connected by a pivot pin 30 to the outer end of the operating arm 15. A plunger 31 is slidably fitted in the cage or casing 26 and has its lower end pivoted as at 32 to the enlarged end of the lever 23. The plunger 31 slides through a combined guide and abutment 34 threaded into the lower open end of the cage 26 and held accurately positioned by a lock screw 35. The sliding movement of the plunger 31 is permitted independently of the position of the eyebolt 28 since the plunger 31 has an axial opening 33 into which the eyebolt 28 loosely telescopes. The upper end of the plunger 31 is formed with an outwardly directed annular flange 36 which engages the upper end of a coil spring 37, the coil spring 37 encircling the plunger below its flange 36 and having its lower end engaging with the adjustable abutment 34. By appropriately adjusting the abutment 34 and by adjusting the eyebolt 28 in the assembly the proper tension may be placed on the spring 37 and the main clutch band 6 tightened or loosened to adjust it properly in relation to its clutch drum.

For the purpose of releasing the main clutch band from its clutch drum when the auxiliary control band is disengaged from its drum, a rectractile coil spring 40 is provided and has one end anchored as at 41 on the driving gear 4 and has its other end connected by a link 42 to the enlarged end 22 of the lever 23. The spring 40 is tensioned when the mechanism is operated to apply the main clutch band to its drum and as soon as the auxiliary control drum 16 is released this spring 40 functions to automatically disengage the main clutch band 6 from its clutch drum.

The driving gear 4 is constantly rotated and when the clutch is disengaged, the driving gear carries with it the clutch band 6 and the mechanism connecting the clutch band 6 to the auxiliary control drum 16 and of course it also rotates the auxiliary drum 16. When the usual hand lever is operated to tighten the band 17 on the drum 16, the drum 16 is momentarily stopped and exerts a drag on the lever 23 through the link 20 thereby pulling the lever 23 in a counter clockwise direction as viewed in Figure 1. This movement of the lever pulls the plunger 31 axially of the cage 26, the spring 37 being compressed to permit of this relative movement of the plunger 31 and its casing or cage 26. The spring, however, exerts a yielding pressure on the cage 26 and consequently a yielding pull on the eyebolt 28 and on the operating arm 15 thereby rotating the crank 10 and its crank pin 9 to contract the clutch band 6 about its clutch drum 5 with a yielding pressure. This precludes abrupt application of the driving force to the drum 2 and insures a gradual and smooth transmission of the drive from the driving gear 4 to the drum 2. In this way all of the parts of the machine subjected to the action of the drive are protected against shocks, jars or impact loads and consequently breakage or injury is prevented. Further, the easy and gradual application of the clutch band to its clutch drum prevents overloading of the band and minimizes the wear thereof. As soon as the operator releases or relieves the auxiliary control band 17 of the force that is pressing it against the auxiliary drum the spring 40 functions to pull the lever 23 to the left as viewed in Figure 1 thereby relieving the spring 37 of compression and causing the flanged end of the plunger 31 to engage the head 27 of the cage 26 and push the operating arm 15 upwardly thereby positively disengaging the main clutch band from its drum.

What we claim is:

1. A power clutch including a driving element, a main clutch band carried thereby, an auxiliary control drum, means carried by the driving element and connected to the main clutch band for expanding and contracting the same, a lever actuated from the auxiliary control drum and yieldable connection between the lever and said means.

2. A power clutch including a driving element, a main clutch band having one end anchored to the driving element, a crank pivoted to the driving element and pivotally connected to the other end of the main clutch band, said crank having an operating arm, an auxiliary control drum, a lever pivoted on the driving element and linked to the auxiliary clutch drum and an adjustable and yieldable connection between the lever and the operating arm.

3. A power clutch including a driving element, a main clutch band having one end anchored to the driving element, a crank pivoted to the driving element and pivotally connected to the other end of the main clutch band, said crank having an operating arm, an auxiliary control drum, a lever pivoted on the driving element and linked to the auxiliary drum and an adjustable and yieldable connection between the lever and the operating arm and comprising interfitting parts and a spring between said parts for resisting relative movement thereof.

4. A power clutch including a shaft, a driving element thereon, a main clutch band having one end anchored to the driving element, a crank connected to the other end of the clutch band, a pivotal support for the crank on the driving element, an operating arm connected to the crank, an auxiliary control drum loose on the shaft, a manually controlled brake band cooperable with the auxiliary drum, a lever having one end mounted on said pivotal support, a link between the other end of said lever and said auxiliary drum and yieldable connection between the lever and the operating arm.

5. A power clutch including a shaft, a driving element thereon, a main clutch band having one end anchored to the driving element, a crank connected to the other end of the clutch band, a pivotal support for the crank on the driving element, an operating arm connected to the crank, an auxiliary control drum loose on the shaft, a manually controlled brake band cooperable with the auxiliary drum, a lever having one end mounted on said pivotal support, a link between the other end of said lever and said auxiliary drum and a yieldable connecting element between the lever and the operating arm and spring means cooperable with the lever for releasing said main clutch band when said auxiliary drum is released.

6. A power clutch including a shaft, a driving element thereon, a main clutch band having one end anchored to the driving element, a crank connected to the other end of the clutch band, a pivotal support for the crank on the driving element, an operating arm connected to the crank, an auxiliary control drum loose on the shaft, a manually controlled brake band cooperable with the auxiliary drum, a lever having one end mounted on said pivotal support, a link between the other end of said lever and said auxiliary drum and a yieldable connecting element between the lever and the operating arm and comprising a cage adjustably connected to the operating arm, a plunger pivotally connected to the lever and slidable through the cage and a spring interposed between the plunger and the cage.

7. A power clutch of the type having a main clutch and an auxiliary control drum therefor, and comprising operating mechanism actuated by the auxiliary control drum and connected to the main clutch, and a yieldable connection incorporated in said operating mechanism and including interfitting parts, adjustable means connecting one of said parts to said main clutch, means connecting the other part to the auxiliary control drum, and a spring interposed between said parts.

8. A power clutch including a driving element, a main clutch band carried thereby, an auxiliary control drum, means carried by the driving element and connected to the main clutch band for expanding and contracting the same, linkage connecting said auxiliary clutch drum and said means and a yieldable connection incorporated in said linkage, and comprising relatively movable parts and a spring resisting relative movement of said parts, one of said parts being adjustably connected to the element of the linkage with which it is associated, the other part having means for varying the tension of said spring.

9. A power clutch including a driving element, a main clutch band carried thereby, an auxiliary control drum, means carried by the driving element and connected to the main clutch band for expanding and contracting the same, a lever having one end fulcrumed on the driving element, a link connecting the other end of the lever and the auxiliary control drum, said means having an operating arm, and a yieldable connection between said lever and said operating arm.

10. A power clutch including a driving element, a main clutch band carried thereby, an auxiliary control drum, means carried by the driving element and connected to the main clutch band for expanding and contracting the same, a lever having one end fulcrumed on the driving element, a link connecting the other end of the lever and the auxiliary control drum, said means having an operating arm, and a yieldable connection between said lever and said operating arm, and including a cage adjustably connected to the operating arm and also carrying an adjustable abutment, a plunger pivoted to the lever and slidable in said cage and also having an abutment, and a spring interposed between said abutments.

11. A power clutch including a driving element, a main clutch band carried thereby, an auxiliary control drum, means carried by the driving element and connected to the main clutch band for expanding and contracting the same, a lever having one end fulcrumed on the driving element, a link connecting the other end of the lever and the auxiliary control drum, said means having an operating arm, and a yieldable connection between said lever and said operating arm, and including relatively movable parts connected to the arm and lever respectively, and a spring resisting relative movement of said parts.

12. A power clutch including a driving element, a main clutch band carried thereby, an auxiliary control drum, a manually operable brake therefor, means carried by the driving element and connected to the main clutch band for expanding and contracting the same, linkage connecting said auxiliary control drum and said means, and a yieldable shock absorbing connection incorporated in said linkage and acting to absorb shocks and preclude overloading of the main clutch band when the same is contracted under the influence of the auxiliary control drum.

13. A power clutch including a shaft, a driving element thereon, a main clutch band having one end anchored to the driving element, a crank connected to the other end of the clutch band, a pivotal support for the crank on the driving element, an operating arm connected to the crank, an auxiliary control drum loose on the shaft, a manually controlled brake band cooperable with the auxiliary drum, a linkage connecting said auxiliary drum and said operating arm and embodying a cage connected to the operating arm and a plunger connected to the parts of the linkage actuated by the auxiliary drum, said plunger being slidably fitted in said cage and a spring interposed between the cage and the plunger.

In witness whereof, we hereto affix our signatures.

HOLGER L. MITCHELL.
ROLF LJUNGKULL.